Sept. 14, 1926.
M. PERKISS
NASAL DOUCHE
Filed Nov. 22, 1924
1,599,787
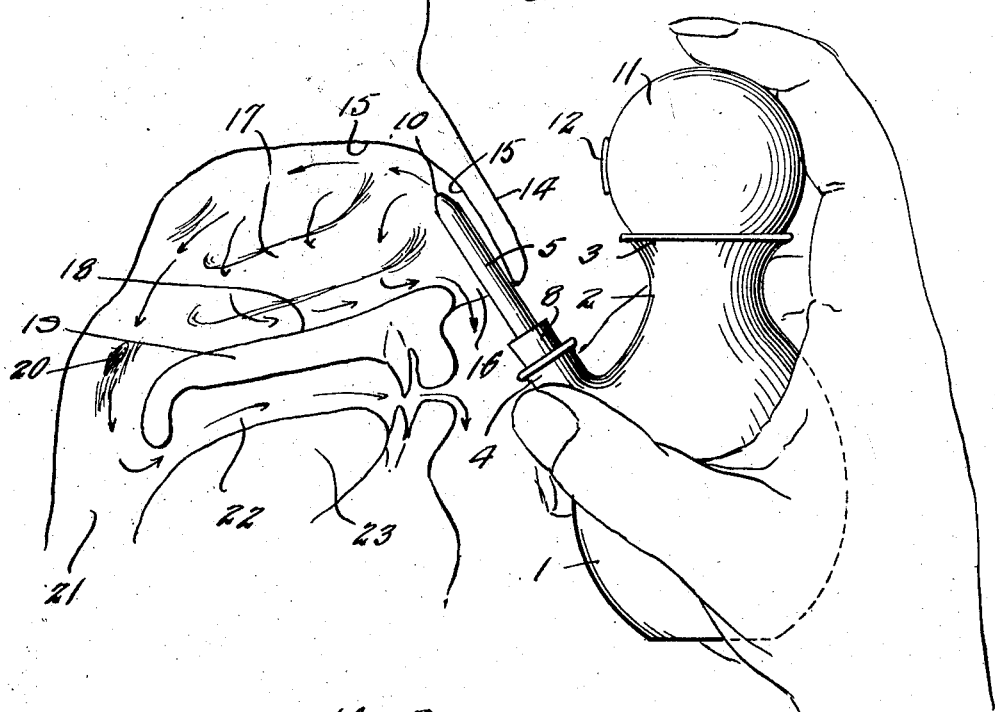
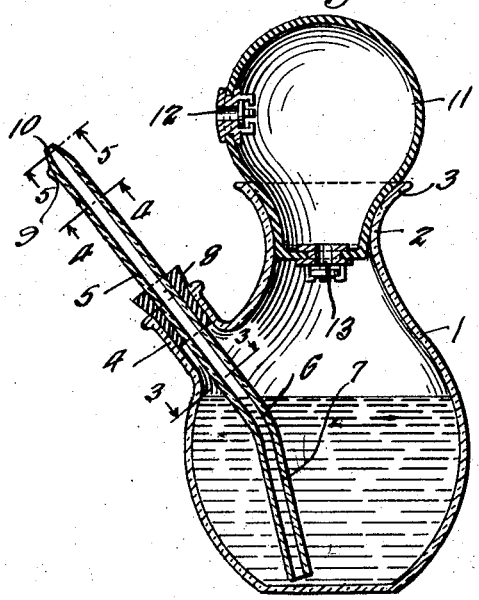
Meyer Perkiss,
Inventor Patented Sept. 14, 1926.

1,599,787

UNITED STATES PATENT OFFICE.

MEYER PERKISS, OF BROOKLYN, NEW YORK.

NASAL DOUCHE.

Application filed November 22, 1924. Serial No. 751,668.

The object of my invention is to provide an improved device for flushing the nasal cavity from above and in front, thereby cleansing the upper and back as well as the lower and middle regions, to provide a device of this sort having the most desirably shaped nozzle, and to provide a device which can be operated by one hand.

I attain these and other advantages by the device illustrated in the accompanying drawings, in which—

Figure 1 is a side elevation of the device in use, the nasal cavity of a person being shown in section and the direction of the flow of liquid also being illustrated by arrows;

Fig. 2 is a vertical section through same;

Fig. 3 is a section on line 3—3 of Fig. 2;

Fig. 4 is a section of the tube on line 4—4 of Fig. 2; and

Fig. 5 is a section on line 5—5 of Fig. 2.

Like numerals indicate like parts in each of the several views.

Referring to the accompanying drawings, I provide a suitable vessel, container or receptacle 1 of any suitable material, preferably glass, of a form and size to be comfortably held in the hollow of one hand, as shown in the drawings. The container 1 is provided with a large mouth 3 having restricted neck 2 in which is seated a rubber bulb 11 which is provided with a valve passage 12 positioned on the side of the rubber bulb, as illustrated, and a conventional valve passage 13 for the intake of air into the bulb and its expulsion into the interior of container 1. Container 1 is provided with an outlet 4 in which is positioned a piece of rubber tubing or other tunneled obturator 8 in which is mounted a suitable stiff tube 5, preferably of glass, or hard rubber passing through the outlet and extending down to the bottom of the reservoir 1. Tube 5 is bent at 6 so that its lower portion 7 extends downwardly in a more nearly vertical direction, whereby the device will function, although the contents of the container are low when it is tilted in the direction of the outlet. The tube 5 tapers at 9 toward the discharge opening 10, as illustrated in Figs. 2 and 5. The tube 5 is of circular cross section throughout the major portion of its length but when it reaches the point indicated by line 4—4 on Fig. 2 it is flattened and from point 9 to the point indicated by line 5—5 is both flattened and the caliber diminished, to facilitate its insertion in the nasal cavity.

In operation, the device acts as follows: The rubber bulb is removed and the reservoir 1 is filled with medicated fluid or whatever liquid is to be used. The bulb 11 is replaced and the entire apparatus is held in the hollow of one hand, usually the right hand. Outlet 4 is rested on the outstretched thumb which steadies the apparatus, while the index finger is placed on bulb 11. The entire apparatus thus held firmly in one hand, the projecting nozzle 9 is introduced into the nasal passage 16, as shown in Fig. 1, with the discharge container placed along the oblique front portion 15 of the roof of the nose 14, as illustrated in Fig. 1, the shape of the nozzle being especially adapted for such use. The slightest compression by the finger of the operator on bulb 11 causes a jet of fluid to flow up into the upper region of the nose and thus the nasal cavity is flushed from in front and above downward and backwards as indicated by the arrows which indicate the flow of the fluid to the surface of the floor 19 of the nasal cavity and back and through the nasal pharynx 20 into the throat and through the mouth 22 of the patient, the tongue of the patient being indicated by the numeral 23.

My device has various advantages over the devices heretofore used and especial attention is directed to the following:

It is easily sterilizable as a whole by heat or other method without damage to any part of or the entire mechanism, and without having to take apart any of the constituent parts; hence it can be used by several members in the same family.

The projecting portion 9 is of caliber, shape and projecting angle as to easily and painlessly be placed along the roof of the front portion of the nose without completely obstructing the entrance to the same nostril. The latter has the advantage of preventing the forcing of fluid into the ear of the same or other side through the eustachian tubes. This device does not exist in any nasal douche hitherto devised.

The force necessary to project the fluid by the action of the finger of the same hand that holds the apparatus is slight. The force can also be modified at the will of the holder. This point helps to project a column of fluid sufficient to flush the nasal cavity without irritating the mucous membrane of the nose which is easily made painful by the slightest increase in the force of the projecting fluid. This is only possible by holding the douche and controlling it by the same hand.

The entire mechanism is operated by one hand.

The nasal cavities are cleansed, douched or irrigated by a flushing action brought about by a projection of a column of fluid within the nose, and not from the entrance, as in other devices.

The flushing is effected from within an upper region of the nasal cavity in an upward and backward direction.

The fluid is discharged through the same, or other nasal cavity, or through the back into the throat.

What I claim is:

1. In a nasal douche, the combination of a container for holding a medicated fluid, a rubber bulb seated in the neck of the container, the container having an outlet at one side thereof, a tunneled obturator mounted in the outlet of the container, a tube mounted in the obturator, the tube being flattened near its discharge portion and having its discharge portion both flattened and diminished in caliber, the container being of suitable size and generally elliptical contour to be held in and fit in the palm of one hand and having the outlet positioned to be engaged by the thumb of the hand holding the container, the container also being of suitable height to permit of operation of the bulb with one finger of the hand which holds the container.

2. In a nasal douche, the combination of a container for holding a medicated fluid, a rubber bulb seated in the neck of the container, the container having an outlet at one side thereof, a tube suitably mounted in the outlet, the tube being flattened near its discharge portion and having its discharge portion both flattened and diminished in caliber, the container being of suitable size and generally elliptical contour to be held in and fit in the palm of one hand and having the outlet positioned to be engaged by the thumb of the hand holding the container, the container also being of suitable height to permit of operation of the bulb with one finger of the hand which holds the container.

3. In a nasal douche, the combination of a container for holding a medicated fluid, said container having the bottom thereof rounded for fitting in the palm of the hand and having a narrow neck opening out of the container and positioned to be engaged by the thumb of the hand holding the container, a tunneled obturator mounted in the offset outlet, a tube passing through the outlet and extending down into the bottom of the container, said tube being of elliptical form near and at its discharge end and projecting substantially beyond the obturator, and a rubber bulb seated in the neck of the container.

MEYER PERKISS.